(12) United States Patent
Burczyk et al.

(10) Patent No.: US 7,258,059 B2
(45) Date of Patent: Aug. 21, 2007

(54) PRESSURE MEDIATOR WITH SEPARATING MEMBRANE AND METHOD FOR THE PRODUCTION THEREOF

(75) Inventors: Dietfried Burczyk, Teltow (DE); Wolfgang Dannhauer, Teltow (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/524,759

(22) PCT Filed: Oct. 12, 2002

(86) PCT No.: PCT/EP02/11440

§ 371 (c)(1),
(2), (4) Date: Oct. 31, 2005

(87) PCT Pub. No.: WO03/036250

PCT Pub. Date: May 1, 2003

(65) Prior Publication Data

US 2006/0117945 A1    Jun. 8, 2006

(30) Foreign Application Priority Data

Oct. 19, 2001   (DE) ................................. 101 52 681

(51) Int. Cl.
*G01L 7/08*   (2006.01)
*F16J 3/00*   (2006.01)
(52) U.S. Cl. .......................... 92/104; 264/509; 73/715
(58) Field of Classification Search ................ 92/96, 92/104; 73/715; 264/505, 509, 510, 570
See application file for complete search history.

(56) References Cited

U.S. PATENT DOCUMENTS

| | | | | |
|---|---|---|---|---|
| 3,072,150 A | * | 1/1963 | Hastings et al. | ............... 92/104 |
| 3,722,373 A | * | 3/1973 | Beach et al. | ................... 92/104 |
| 4,006,640 A | | 2/1977 | Gealt | |
| 4,046,010 A | * | 9/1977 | Akeley | ........................ 73/706 |

(Continued)

FOREIGN PATENT DOCUMENTS

DE          100 31 120 A1     1/2002

(Continued)

OTHER PUBLICATIONS

Patent Abstract of Japanese publication No. 58060232, published Sep. 4, 1983, from the EPO.

*Primary Examiner*—Thomas E. Lazo
(74) *Attorney, Agent, or Firm*—Bacon & Thomas, PLLC

(57) ABSTRACT pressure mediator comprising a base body having a membrane bed, wherein said base body has a first material with a first thermal expansion coefficient, in addition to a separating membrane having a second material with a second thermal expansion coefficient that is smaller than the first thermal expansion coefficient The separating membrane is fixed to the base body by its edge area in such a way that the membrane bed is covered by the separating membrane, and the separating membrane also has a relief that is formed by embossing against the membrane bed after the separating membrane was fixed to the base body. Embossing of the membrane relief is carried out at a temperature below critical temperature of less than approximately 10° C. This makes it possible to obtain a constant membrane characteristic line at low temperatures.

16 Claims, 2 Drawing Sheets

U.S. PATENT DOCUMENTS

| | | | |
|---|---|---|---|
| 4,136,603 A * | 1/1979 | Doyle, Jr. | 92/98 R |
| 4,370,890 A * | 2/1983 | Frick | 73/718 |
| 4,451,370 A * | 5/1984 | Murai et al. | 210/321.77 |
| 5,449,003 A * | 9/1995 | Sugimura | 92/89 |

FOREIGN PATENT DOCUMENTS

| | | |
|---|---|---|
| EP | 0 655 615 A1 | 5/1995 |
| EP | 1 114 987 A2 | 7/2001 |

* cited by examiner

PRESSURE MEDIATOR WITH SEPARATING MEMBRANE AND METHOD FOR THE PRODUCTION THEREOF

FIELD OF THE INVENTION

The invention relates to a pressure mediator, or diaphragm seal, for transferring a pressure from a pressure existing in a first medium onto a second medium.

BACKGROUND OF THE INVENTION

A pressure mediator includes a base body, or platform, and a separating membrane, or diaphragm, which is secured with its edge to the base body, such that the separating membrane can be placed with its first, platform-far face in contact with the first medium. With its second, platform-near face, the membrane forms with the platform a pressure chamber, which can be filled with the second medium. The pressure chamber has a pressure chamber opening, through which the pressure can be transferred by means of the second medium. The second medium is usually an incompressible liquid, especially a hydraulic oil.

Separating membranes usually are provided with a relief of concentric waves, which enable a sufficiently large membrane stroke for accommodating a variable volume of the transfer liquid in the pressure chamber. The surface of the base body in the pressure chamber is usually embodied as a membrane bed, whose relief largely matches that of the separating membrane, so that the separating membrane can lie flush against the membrane bed in the case of overload. The separating membranes are usually pressed against the membrane bed, in order to emboss them with the desired relief.

In the case of pressure mediators for use with corrosive media, the separating membranes are preferably made of a corrosion-resistant material, especially a corrosion-resistant metal, or a corrosion-resistant alloy. Separating membranes of tantalum are preferably used for this purpose. Since the base bodies are usually made of VA-steel, problems arise in practice due to the different coefficients of thermal expansion of tantalum and steel, that for tantalum being $6.5 \cdot 10^{-6}/K$ for tantalum and that for V2A-steel being about $16 \cdot 10^{-6}/K$.

If one assumes, for example, that the pressure mediator will be used over a temperature range of about 300° K, for example between 230° K and 530° K, then a separating membrane of tantalum will expand over this temperature range by only about 0.21%, while the expansion of the V2A-platform will amount to 0.48%. The difference in the thermal expansion over this temperature range thus amounts to 0.27%.

For a pointed illustration of the problem resulting therefrom, first assume that the membrane is planar. A planar, circular, separating membrane, welded stress-free onto the base body at the upper temperature limit, would exhibit an equilibrium position having a deflection of about 6.3% of the radius at the lower temperature limit. To be more precise, there would be two equilibrium positions, lying +/−6.3% outside of the plane of the membrane edge. Such a bistable membrane would clearly be unusable for a sensor. The stress-free welding of a planar separating membrane at the lower temperature limit would, it is true, prevent the problem of the deflection due to different coefficients of thermal expansion, but, upon warming, large radial tensile stresses would arise due to the different coefficients of thermal expansion. This would compromise the calibration of the membrane.

The mentioned separating membranes with concentric waves ameliorate the described problem, because, on the one hand, the waves contain sufficient radial length reserves to accommodate the differences in coefficient of thermal expansion, and, on the other hand, the forming of the waves leads to a moderate residual radial tensile stress, which at least lessens the deflection of the membrane in the case of a contraction of the base body. However, at low temperatures, deflections still occur.

SUMMARY OF THE INVENTION

It is, therefore, an object of the present invention to provide a pressure mediator with a separating membrane, which overcomes the disadvantages of the state of the art.

This object is achieved, according to the invention, by a pressure mediator which has a base body with a membrane bed and a separating membrane which is secured along its edge to the base body. The base body is covered by the separating membrane. The separating membrane has a separating membrane relief formed by embossing against the membrane bed after the separating membrane is secured to the base body. The embossing occurs at a temperature less than about 10° C. The membrane bed and the separating membrane have differing coefficients of thermal expansion with that of the separating membrane being less than that of the membrane bed.

The pressure mediator of the invention includes a base body of a first material and a separating membrane, which comprises a second material having a coefficient of thermal expansion smaller than that of the first material and which is secured with its edge to the base body, with the base body having a membrane bed, which is covered-over by the separating membrane and which exhibits a relief, with the separating membrane having a separating membrane relief formed by embossing against the membrane bed following securement of the separating membrane to the base body, characterized in that the embossing of the membrane relief occurred at a temperature of less than about 10° C.

The temperature of the pressing is preferably, at most, 0° C., more preferably, at most, −10° C., and especially preferably, at most, −20° C. In a very especially preferred form of embodiment, the temperature of the pressing is less than −40° C.

The term "temperature" refers to the temperature determining the geometric characteristics of the separating membrane and the membrane bed, thus, for example, the free diameter of the separating membrane over the membrane bed and the separation between neighboring waves of the membrane bed. This will, in most cases, be the base body temperature to which the base body is cooled before the embossing. Thus, since the separating membrane has a significantly smaller heat capacity than the base body and is connected in good heat transfer contact therewith, the separating membrane will likewise have about the temperature of the base body, when no special measures are taken to keep the separating membrane at a higher temperature.

If the separating membrane is contacted by an embossing punch or a hydraulic medium at another temperature during the embossing, this will change the temperature of the membrane and, possibly, the membrane bed, within certain limits. The embossing should, therefore, preferably occur rapidly, such that the temperature change during the embossing has as little influence as possible on the geometry at the time of the embossing.

Tests have shown that the separating membranes of the pressure mediator of the invention continue to have a

BRIEF DESCRIPTION OF THE DRAWINGS

The invention will now be explained in greater detail on the basis of the accompanying drawings, the figures of which show as follows.

DESCRIPTION OF THE PREFERRED EMBODIMENTS

Figure 1A:
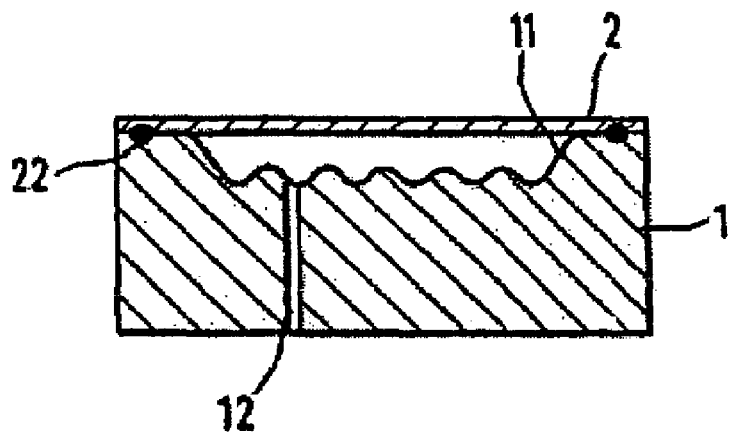
FIGS. 1a-c a series of sectional drawings through a pressure mediator of the invention during various manufacturing steps.
Figure 1B:
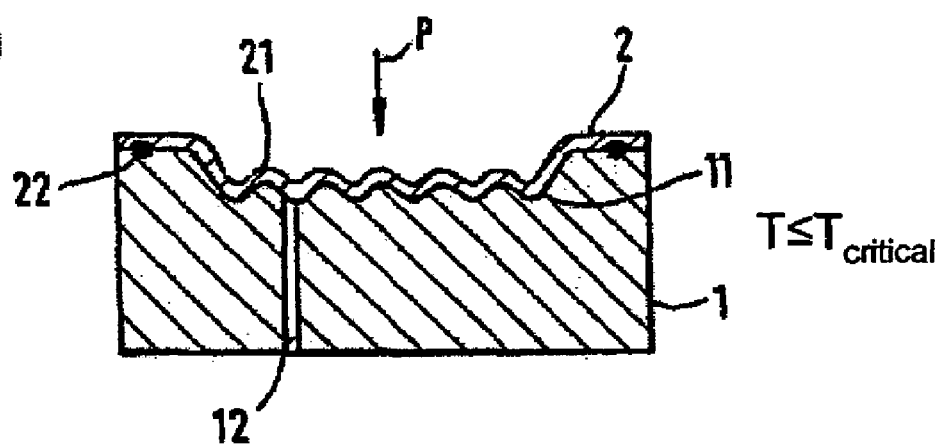
Figure 1C:
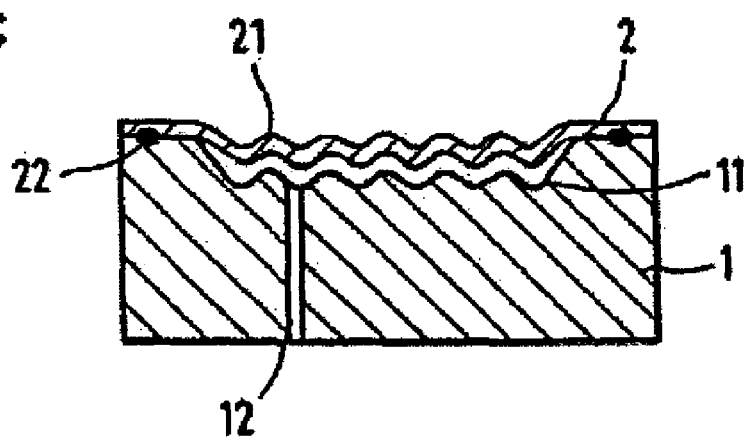

FIGS. 1a-c show a cross section through the pressure mediator, or diaphragm seal, of the invention during various phases of its manufacture. Base body, or platform, 1 has on one face a membrane bed 11, with a duct 12 extending from the membrane bed 11 to the oppositely-situated face of the base body. In the figures, the duct is shown parallel to the axis of symmetry of the base body; fundamentally, however, the duct can have any other shape, so long as it produces a connection between the membrane bed and another surface of the base body. Secured pressure-tightly on the first face of the base body is a separating membrane 2, first in the form of a planar disk, or circular blank, with the separating membrane 2 completely covering the membrane bed 11. The securement is accomplished preferably by welding along a weld seam 22, or by a corresponding braze joint, which closes on itself in the edge region of the membrane, as illustrated in FIG. 1a. Then, the relief of the membrane bed 11 is transferred onto the separating membrane 2 by application of an embossing pressure P in suitable manner onto the separating membrane 2, until the separating membrane 2 lies completely flush against the membrane bed (FIG. 1b). The embossing pressure P can be applied to the separating membrane 2, for example, hydraulically, or the embossing can be accomplished using an elastic stamp, for example one of rubber, which adapts to the relief 11 of the membrane bed, or, more accurately, the resulting relief 21 of the separating membrane. By the embossing, the separating membrane is plastically deformed and exhibits, in its new state of equilibrium, the separating membrane relief 21.

By the embossing of the separating membrane 2, on the one hand, tensile stresses are introduced into the membrane 2, and, on the other hand, the membrane contour 21 receives sufficient length reserves, such that the separating membrane then has enough stroke to accommodate volume fluctuations of a transfer liquid.

As discussed above, the level of the tensile stresses is a function of the temperature existing at the moment, especially when the base body and the separating membrane have different coefficients of thermal expansion.

Figure 2:
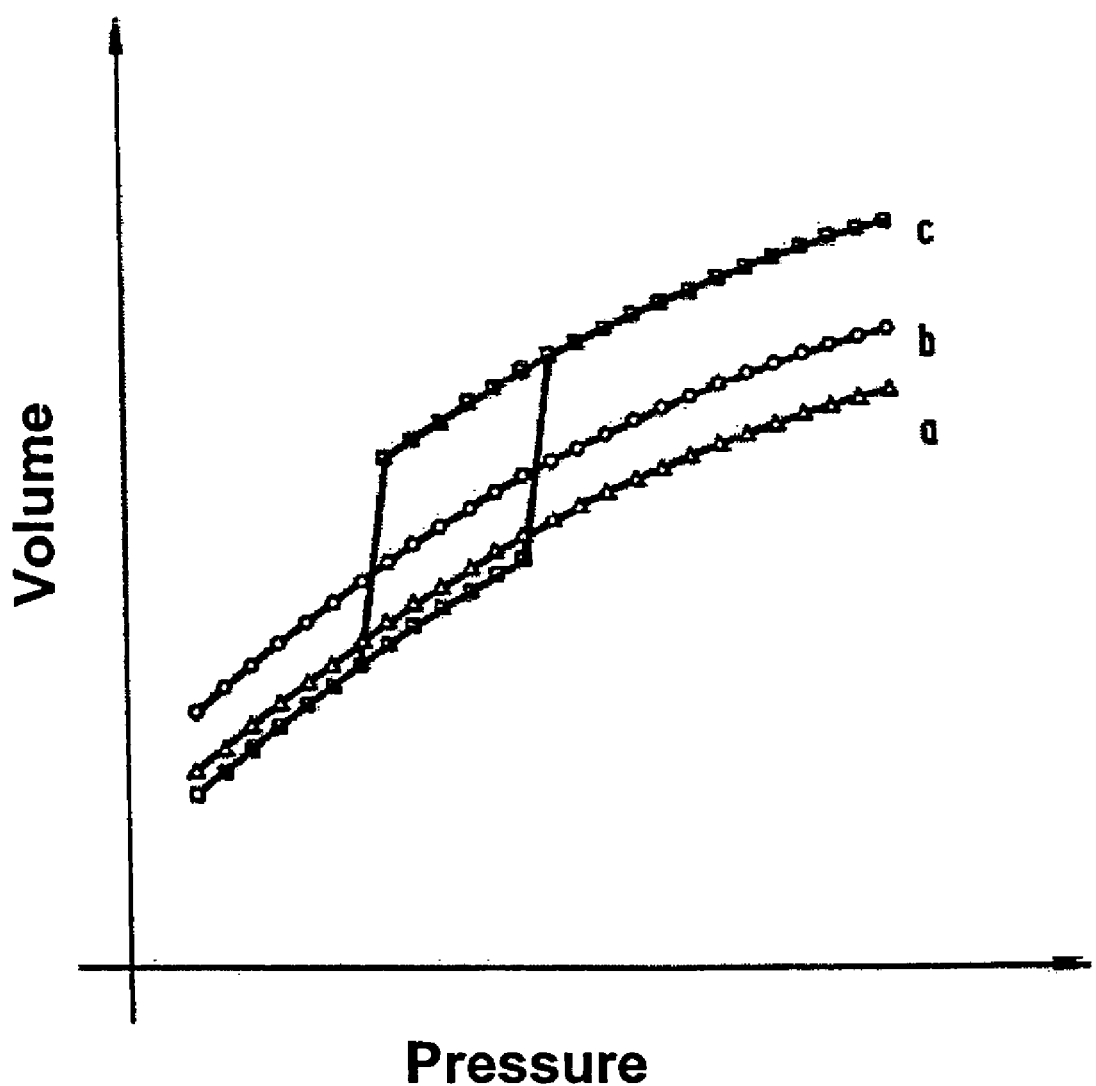
FIG. 2 a graph of various pressure-volume characteristic curves.

The influence of various embossing temperatures on the characteristic curve of the membrane at low temperatures is illustrated in the diagram of FIG. 2. The characteristic curves of the diagram show the volume between the membrane and the membrane bed as a function of pressure.

In particular, curve a shows the characteristic curve of a membrane at a low temperature, for example minus 20 degrees C., for the case where the embossing of the membrane occurred at room temperature. The membrane and the base body have the same coefficients of thermal expansion, so that a cooling of the pressure mediator does not lead to any "sagging" of the membrane. Over the working range of the membrane indicated with an arrow, the characteristic curve exhibits an essentially linear behavior.

Curve c shows, in contrast, the characteristic curve of a membrane, which was embossed at room temperature against a base body having a larger coefficient of thermal expansion. At low temperatures, this leads to a discontinuous characteristic curve for the membrane, as evidenced by the hysteresis behavior indicated in the diagram. The use of pressure mediators with such membrane characteristic curves requires great compromise with respect to accuracy of measurement, so that such mediators should not really be used.

Curve b shows, finally, the membrane characteristic curve of a pressure mediator of the invention at low temperatures, with, for example, a tantalum separating membrane on a steel base body. While, in this case, the membrane still has a smaller coefficient of thermal expansion than the base body, on which it is secured, nevertheless, the embossing of membrane bed onto the membrane was done at a sufficiently low temperature, for example −20° C. This assures that the separating membrane still has sufficient internal, residual tensile stresses at the low temperatures to be expected during the making of measurements. Therefore, the separating membrane maintains a linear characteristic curve, even at low temperatures, despite the different coefficients of thermal expansion of the membrane and base body.

In the case of separating membranes, whose waves in the central region of the membrane extend essentially in a plane displaced from that of the membrane edge, the lowering of the embossing temperature is accompanied by an increase of the volume enclosed between the membrane and the membrane bed in the equilibrium position. For, due to the residual tensile stresses remaining at lower temperatures, the separation between the plane of the membrane edge and the plane of the central membrane region becomes less. Consequently, curve b in FIG. 2 runs above curve c near the equilibrium position. In the case of otherwise unchanged device characteristics, the equilibrium volume at low temperatures is, therefore, an indicator of the embossing temperature.

Although it is currently preferred to accomplish the embossing hydraulically, especially with a head of water or a hydraulic oil, equally a flexible punch, for example of rubber or another elastomer, that sufficiently adjusts flexibly to the contour of the membrane bed, can be used. Likewise, a punch with a metal die can be used, in which case the die is shaped to be complementary to the desired membrane relief, that is, complementary to the relief of the membrane bed.

For special instances of application, where the embossing temperature should be as low as possible and not adversely influenced by a punch or a hydraulic medium, the embossing can also be accomplished with liquid nitrogen or some other substance, whose freezing point lies below the embossing temperature.

Equally usable for embossing at low temperatures is a punch equipped with cooling means. To this end, a circulatory system for a suitable coolant can be located inside the punch, in good heat-exchanging contact with its embossing surface, for example in the form of a metal die, with the coolant being caused to flow through the circulatory system. Liquid nitrogen is especially well suited as a coolant for extremely low temperatures.

The embossing of the separating membrane occurs, preferably, at a pressure between 150 and 500 bar, more preferably between 200 and 400 bar and especially preferably between 250 and 350 bar.

The duration of the embossing amounts, preferably, to between 1 and 120 seconds, more preferably between 10 and 90 seconds and especially preferably between 30 and 60 seconds.

The invention claimed is:

1. A pressure mediator, having:
    a base body with a membrane bed, wherein said base body comprises a first material with a first coefficient of thermal expansion; and
    a separating membrane, which comprises a second material with a second coefficient of thermal expansion smaller than said first coefficient of thermal expansion, wherein:
    said separating membrane is secured in its edge region to said base body in such a way that said membrane bed is covered over by said separating membrane;
    said separating membrane has a separating membrane relief, which is formed by embossing against said membrane bed, after securement of said separating membrane to said base body; and
    said embossing of said membrane relief occurred at a temperature of less than about 10° C.

2. The pressure mediator as claimed in claim 1, wherein:
    the embossing of said separating membrane occurs at a temperature of, at most, 0° C.

3. The pressure mediator as claimed in claim 1, wherein:
    said separating membrane comprises a corrosion-resistant alloy or tantalum.

4. The pressure mediator as claimed in claim 1, wherein:
    said base body comprises a VA-steel.

5. The pressure mediator as claimed in claim 1, wherein:
    said separating membrane is secured to said base body by a self-closing weld seam or braze joint.

6. The pressure indicator as claimed in claim 1, wherein:
    the embossing of said separating membrane occurs at a temperature of, at most −10° C.

7. The pressure mediator as claimed in claim 1, wherein:
    the embossing of said separating membrane occurs at a temperature of, at most −20 C.

8. The pressure mediator as claimed in claim 1, wherein:
    the embossing of said separating membrane occurs at a temperature of, at most −40° C.

9. A method of manufacturing a pressure mediator, comprising the steps of:
    providing a base body with a membrane bed;
    securing a separating membrane to the base body; and
    embossing a relief of the membrane bed onto the separating membrane at a temperature of, at most, 10° C.

10. The method as claimed in claim 9, wherein:
    said step of embossing occurs at a temperature of, at most, 0° C.

11. The method as claimed in claim 9, wherein:
    said step of embossing occurs hydraulically.

12. The method as claimed in claim 11, wherein:
    said hydraulic embossing occurs with a hydraulic liquid, whose temperature amounts to not more than 20° C.

13. The method as claimed in claim 9, wherein:
    said step of embossing occurs at an embossing pressure between 250 and 350 bar.

14. The method as claimed in claim 9, wherein:
    said step of embossing occurs at a temperature of, at most −10° C.

15. The method as claimed in claim 9, wherein:
    said step of embossing occurs at a temperature of, at most −20° C.

16. The method as claimed in claim 9, wherein:
    said step of embossing occurs at a temperature of, at most −40° C.

* * * * *